March 7, 1967  J. S. COMSTOCK ETAL  3,308,396
SPRING ENERGIZED LASER ROTATING TRIGGER
Filed May 15, 1963  3 Sheets-Sheet 1
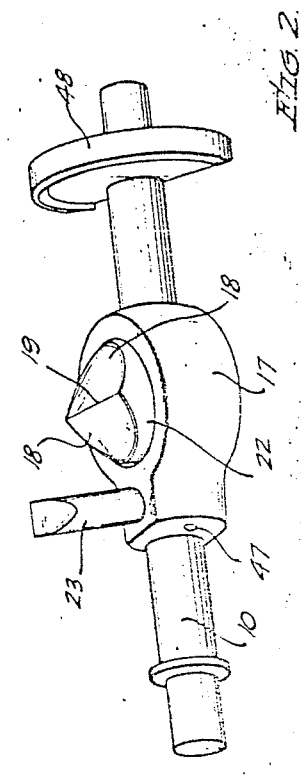
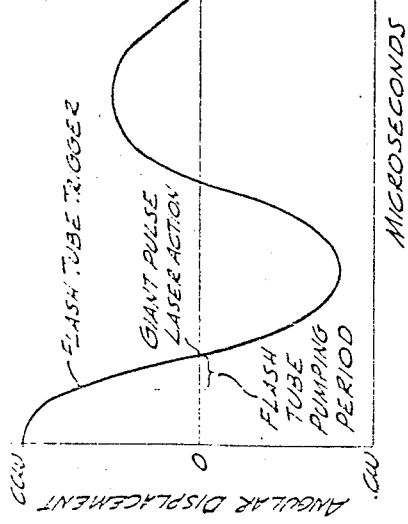
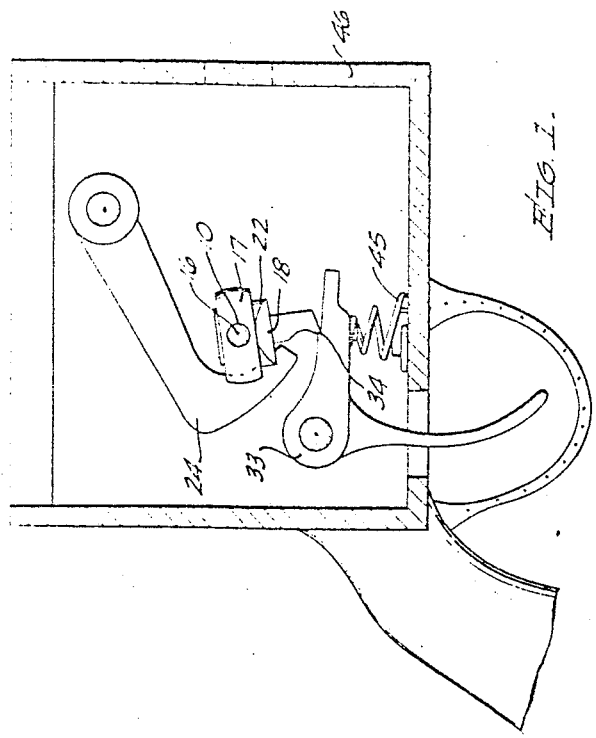
INVENTORS.
JOHN S. COMSTOCK,
RONALD L. QUANDT,
BY John M. Koch
ATTORNEY.

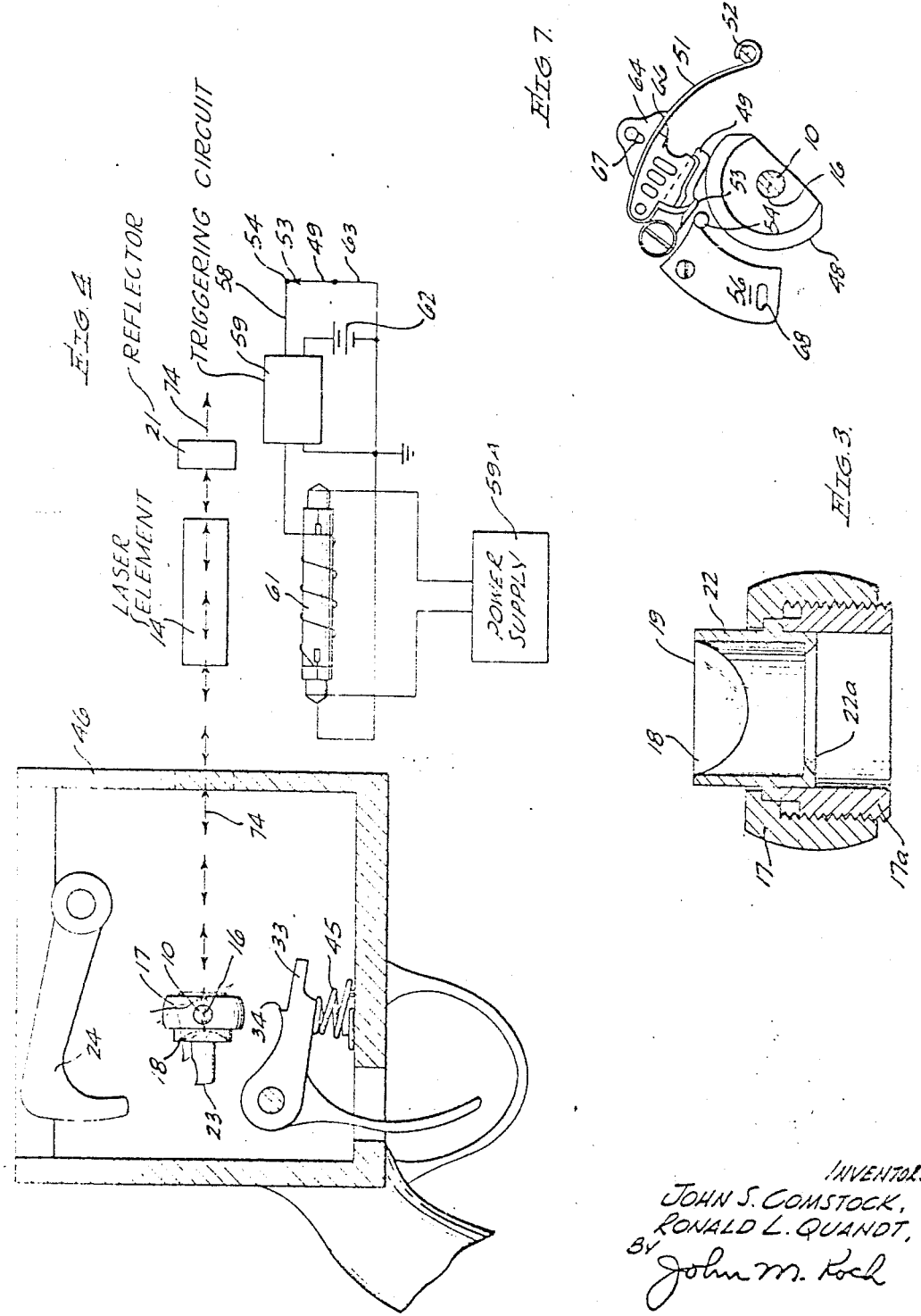

March 7, 1967      J. S. COMSTOCK ETAL      3,308,396
SPRING ENERGIZED LASER ROTATING TRIGGER
Filed May 15, 1963                       3 Sheets-Sheet 3

INVENTORS.
JOHN S. COMSTOCK,
RONALD L. QUANDT,
BY John M. Koch
ATTORNEY.

United States Patent Office 3,308,396
Patented Mar. 7, 1967

1

3,308,396
SPRING ENERGIZED LASER ROTATING TRIGGER
John S. Comstock, Playa Del Rey, and Ronald L. Quandt, Redondo Beach, Calif., assignors to Hughes Aircraft Company, Culver City, Calif., a corporation of Delaware
Filed May 15, 1963, Ser. No. 280,651
3 Claims. (Cl. 331—94.5)

This invention relates to a device for achieving giant laser pulses, and particularly to a mechanical triggering device which acts as a "Q-switch" optical shutter in the laser optical cavity and as a synchronizer to time laser pumping action so as to obtain optimum inversion in the laser material element at the precise instant at which the optical cavity of the laser is completed (shutter is opened) and stimulated emission from the laser material occurs.

Lasers have been adapted for use in coherent light detecting and ranging apparatus. The ruby laser, among others, has been used for such purposes. The maser material employed in the ruby laser consists of an aluminum trioxide crystal doped with trivalent chromium, which gives the crystal a pink color. Very energetic xenon flash tubes are usually used to pump (or excite) the chromium atoms of the ruby crystal from the "ground" level to higher energy (excited) levels. The pumping light is absorbed by the chromium trivalent ions mainly in the blue-green band of wavelengths from 4000 to 6000 Angstroms. The pumped ions decay by thermal, non-radiative processes from this upper level to a very narrow metastable "middle level." From the metastable "middle level" the ions decay to the ground level with radiation of light energy at 6943 Angstroms wavelength. The 6943-Angstrom radiation, ordinarily is observed as a fluorescence.

If a sufficiently powerful fluorescence is generated by hard pumping in a ruby rod, the ends of which are contained between appropriately reflective surfaces accurately parallel to each other, stimulated emission is obtained. The pumped energy at which stimulated emission first occurs is referred to as the laser "threshold." Only energy above threshold results in a stimulated emission output. The stimulated emission oscillates between both reflective plates in a manner similar to the oscillation of microwave energy in a tuned microwave cavity. By making the reflector at one end of the laser crystal, say 80 percent reflective and 20 percent transparent, a part of the stimulated emission contained between the reflectors is coupled out through the partially transparent reflector. This emission is the so-called "classical" or normal laser output.

The energy in a normal laser output is not radiated at a defined or constant amplitude. Individual energy spikes of about 0.1 to 0.5 microsecond duration occur. Individual peak powers ranging from a few hundred to a few thousand watts and usually having irregular spacings comprise the radiated energy output. Research has developed better materials with reasonably uniform lasing characteristics so that the spikes are approximately equal in amplitude and rate of repetition.

In the "Q-switched," "pulsed reflector," or "supercharge" technique, the reflector at the end of the laser crystal is kept nonreflective by artificial means so that a very large energized ion population may be produced in the metastable (middle) level. The laser threshold in this circumstance has thus been artificially raised above that required for "normal" or "classical" laser action by the act of cutting or lowering the "Q" of the optical path between the reflectors. Hence the term "Q-switch." When the reflectivity is suddenly "turned on," the optical feedback path is restored, resonance is established and stimulated emission occurs. All of the stored energy (above threshold) radiates out in less than about one-tenth of a microsecond and produces a very high peak power pulse at the laser output wavelength. Pulse durations of less than ten nanoseconds and peak powers of the order of 100 megawatts have been observed. The fast rise times obtained with the "Q-switched" laser are essential to accurate active ranging at any time, and particularly in poor visibility weather. While this discussion is limited to ruby lasers, many other laser materials work as well using the "Q-switch" technique.

Two general approaches are used to produce the "Q-switch" required to generate these narrow pulses, an electro-optical approach and a mechanical approach. Typical techniques in each category are described herein. The electro-optical approach uses a mirror, a Kerr-cell or a Pockel-cell, and a fixed polarizer at one end of the laser rod. A partially transparent reflector is usually used at the other end for output coupling. By applying an appropriate voltage to the Kerr or Pockel-cell, a half wave plate is effectively created. When the plane of polarization of the light leaving, say, the Kerr-cell (after having passed through the cell, been reflected from the mirror, and passed through the cell a second time) and that of the fixed polarizer are crossed (at 90°) there is effectively no reflectivity and a raised laser threshold is produced. At the moment that the planes of polarization are the same (for example, when the applied voltage is rapidly removed from the cell) reflectivity is fully re-established to complete the optical path between the mirror and the partially reflective surface at the other end of the laser crystal, resonance is established, and "giant pulse" stimulated emission occurs.

The Kerr-cell employs liquid nitrobenzene, or similar birefringent liquids, to accomplish "Q-switched" action in an optical cavity. Similar devices employing solid birefringent materials, called Pockel cells, also have been used. However, these devices are limited to use with relatively large apparatus and can be operated only at moderate and controlled temperatures. Nitrobenzene, for example, freezes at 5.7° C. Potassium dihydrogen phosphate, which is one of the solid birefringent materials employed in the Pockel-cell, is soft, difficult to work and is water soluble. In addition, very high voltage is required to achieve electro-optical shutter action in such Kerr-cell and Pockel-cell "Q-switched" devices. Such devices are not readily adapted for manpack, airborne or satellite applications because of their weight and bulk as well as their limited temperature applicability.

The mechanical approach includes rotating one of the reflectors of the laser assembly from a "non-reflective" to a "reflective" position. This may be accomplished by using a motor. At the moment this reflector is sufficiently parallel to the reflector at the other end of the crystal, (thus producing the "reflective" condition) resonance is established and giant pulse stimulated emission occurs from the pumped laser. Various other mechanical shutter devices have been proposed for the purpose of accomplishing "Q-switched" action in the optical cavity of the laser. For example, a "Q-switch," which operates essentially as does a camera shutter by opening and closing the optical path between the laser reflector by means of direct interception of the beam with an opaque object, may be used to produce giant pulses also. However, in order for the optical shutter to "open" quickly enough (a few nanoseconds) to produce optimum pulses, the speed of the shutter opening must be vary high and the opening small. In addition, some damage may occur to the edges of the opening if the laser beam intensity is high, as it will be in giant pulse applications.

In another device, a piezoelectric crystal is mounted in optical contact with one side of a roof prism which serves as one of the laser reflectors. The roof prism is employed to obtain total internal reflection of light emitted from the laser material at the instant at which a giant pulse is triggered from the laser material. In the contacted state, the normal total reflectivity of the roof prism reflector is destroyed. The physical arrangement of the piezoelectric crystal and the roof prism is such that when the piezoelectric crystal is electrically stressed, the crystal shrinks along the dimension thereof which is perpendicular to the face of the roof prism and hence moves away from the surface contacted by the crystal. In this electrically stressed condition, the crystal restores the total internal reflecting properties of the roof prism. By appropriately timing the pumping action of the flash tube and rotation of the motor shaft or the electrical impulse applied to the piezoelectric crystal to electrically stress the same, a giant pulse action is brought about in the laser cavity.

Prior art mechanical methods have several serious disadvantages for manpack, airborne and satellite applications, which afford rugged environments. Very high speed motors are susceptible to dust and wear. They also increase power drain. In the frustrated internal reflection devices, it is very difficult to make certain that the proper physical arrangement of the piezoelectric crystal and roof prism can be maintained. In addition, such devices are very susceptible to impurities in the atmosphere surrounding the piezoelectric crystal and roof prism assembly. For example, dust particles have been known to lodge between the parallel crystal and prism faces and to completely prevent laser action.

Accordingly, it is an important object of this invention to provide a device to accomplish "Q-switched" action in an optical cavity of a laser material element, which is highly satisfactory for manpack, airborne and satellite applications, involving wide variations in temperature and extremely intense vibrations and shock environments, necessitating rugged structural features in the device.

Another object of this invention is to provide such a "Q-switched" device which does not require auxiliary power for its operation, is capable of light weight, compact construction, and is rugged, simple and positive in its action.

Additional objects will become apparent from the following description, which is given primarily for purposes of illustration, and not limitation.

Stated in general terms, the objects of this invention are attained by mounting a reflector, such as a totally internal reflecting roof prism, on a rotatably mounted shaft, preferably having both ends thereof mounted in bearings, and preferably adapted to operate as a torsional pendulum. Potential energy means, such as a stiff helical spring, are used to supply sufficient torquing energy for rapid rotation of the shaft. The shaft is first torqued against the power means, such as the helical spring. Then the torqued shaft is released by a trigger mechanism. A cam mounted on the rotatable shaft actuates an adjustable electrical switch to fire the flash tube at the proper time to pump the laser. Upon passing through the optic axis of the laser cavity, the roof prism reflector then completes the reflective path of the laser and a giant laser pulse is emitted from the energized laser material. Any subsequent oscillations of the prism, cam and shaft assembly through the optical axis of the laser cavity are of little consequence, and are rapidly damped.

A more detailed description of a specific embodiment of the trigger mechanism of this invention is given below with reference to the appended drawings, wherein:

FIG. 1 is a side elevational view partially in section showing the trigger mechanism in cocked position mounted in a housing on a hand grip (the torquing spring is omitted in this view);

FIG. 2 is a perspective detail view, drawn to an enlarged scale, showing the shaft, roof prism and cam of the trigger mechanism;

FIG. 3 is a side elevational view partially in section showing details of the roof prism and its mounting;

FIG. 4 is a side elevational view partially in section, showing the trigger mechanism in rotation after being fired;

FIG. 7 is a partial detail view, drawn to an enlarged scale, showing the use of resilient damping material to prevent microphonic switch operation; and FIG. 8 is a graph diagrammatically showing prism rotation and Q-switch operation.

Figure 5:
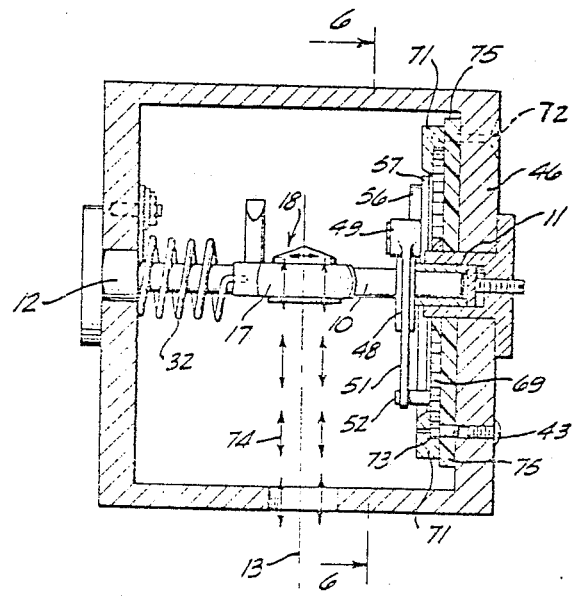
FIG. 5 is a plan view partially in section, showing details of the trigger mechanism.
Figure 6:
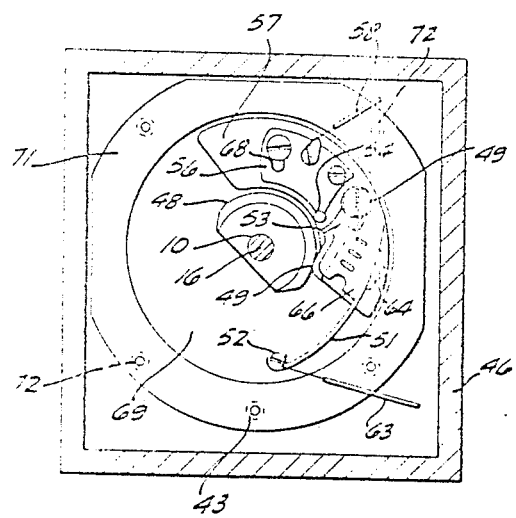
FIG. 6 is a side elevational view partially in section as along line 6—6 of FIG. 5, showing the switch in open position.

A shaft, or rotatably mounted torsional member 10, is mounted for rotation in suitable bearings 11 and 12. The shaft 10 is mounted in bearings 11 and 12 so that its axis is at an angle of 90° to the optic axis 13 of the laser material element 14, and so that the center line 16 of the shaft intersects the optic axis of the laser element.

Shaft 10 is provided with a mounting socket 17 for fixedly mounting therein a totally internal reflecting roof prism 18. The roof prism 18 is so positioned, in the mounting socket 17 of shaft 10, that upon rotation of the shaft about axis 16, the vertex 19 of the roof prism describes a plane containing the optic axis 13. When the vertex 19 of the roof prism 18 is essentially perpendicular to optic axis 13, the roof prism acts as a reflector having total internal reflection and with reflector 21 completes the optical cavity containing laser material element 14, through a window 22A in sleeve 22 held in mounting socket 17. The roof prism 18 is firmly supported and fixed in its mounting sleeve 22, with the aid of a suitable cement, so that the rapid acceleration, and rapid deceleration, of the shaft 10 will not loosen, displace, or injure it in any way.

Attached to shaft 10 and extending therefrom is a trigger sear 23. Trigger sear 23 is constructed to serve as a lever to be engaged by the cocking lever 24, and to be urged against the resistance of the mainspring 32, until it engages the trigger 33, and falls into the trigger notch 34 which trigger is held in place by the sear spring 45.

In this position the device is cocked under loaded mainspring 32. Loaded mainspring 32 is directly coiled about shaft 10 with one end thereof fixed to the housing 46, and the other end fastened in a hole 47 formed in a boss on shaft 10. The cocking action just described winds the coils of spring 32 tighter and reduces their diameter around shaft 10. Any spring, or elastic member, either directly connected, or indirectly acting through a link or links, can be substituted for coiled mainspring 32, as an alternative potential energy means, within the spirit of this invention. Any trigger device which can be substituted for trigger 33 will suffice within the spirit of this invention.

A cam 48 is mounted on shaft 10 to rotate in fixed relationship therewith. As cam 48 rotates, it engages a cam follower 49. When cam 48 engages cam follower 49, and displaces it against the resistance of a spring 51 connected thereto, and attached at a point 52, electrical contact is broken between a contact point 53 carried on the side of the cam follower and another contact point 54 mounted on a block 56. Contact point 54 and block 56 are insulated from the remainder of the mechanism by means of the insulator 57. Contact point 54 on block 56 is electrically connected, through a switch lead 58 to a triggering circuit 59 of conventional type which derives its power from source 62 and which is employed to fire the flash tube 61 which in turn pumps laser material element 14 from energy stored in a voltage source 59A.

Contact point 53 is similarly connected to the triggering circuit through switch lead 63.

By means of this arrangement of this device, contact bounce problems, common to such electrical contact apparatus, are avoided and reliable switching action, free of noise, is achieved. To prevent microphonic operation of the switch, which results in prefiring flash tube 61, and which may take place before cam 48 opens contacts 53 and 54, resilient damping material 64 and 66 is applied to spring 51, as shown in FIG. 7. Damping material 64 and 66 is fastened to spring 51 by a suitable means, and serves to dampen any vibration of both spring 51 and cam follower 49. The resilient damping material 64 and 66 can be a suitable elastomeric material such as silicone rubber, cork, etc. Means for adjusting the pressure on spring 51 is provided at 67 as shown. Spacing adjustment means also is provided on block 56 as shown at 68 whereby the amplitude of engagement of the cam follower can be adjusted.

The timing of the pumping flash tube 61 should be set at an optimum time interval before roof prism reflector 18 reaches the position in which the optical resonance path of the laser cavity is completed. The timing of the pumping flash tube 61 is adjusted by rotating the subassembly of the switch around axis 16 of shaft 10, and properly setting the switching assembly position so that the switch is operated by cam 48 at the desired time interval before the lasering position is reached. In the illustrated device, this is accomplished by mounting the entire switch assembly on the gear 69. Gear 69 is retained by a clamp-ring 71 which is locked with screws 72 when the switch is properly set. These screws are loosened to permit rotation by a pinion gear 73. Mounting gear 69 is cushioned and spaced by resilient nylon spacer 75. After adjustment has been properly made, clamp-ring 71 is tightened to avoid any change in the desired setting.

After the device has been cocked and then released, as described hereinabove, loaded mainspring 32 will drive shaft 10 around with rapid acceleration toward a maximum velocity, which is reached at approximately the lasering position. On the way to that position, cam 48 operates switch contacts 53 and 54, which triggers the pumping flash tube 61. After passing through the lasering position, shaft 10 is rapidly brought to rest by reverse action of mainspring 32. A series of oscillations then occurs in which the energy of mainspring 32 is dissipated. These oscillations have no function in the lasering action, but serve to cushion the shock on roof prism reflector 18.

A roof prism was selected as the rotating reflector used in the preferred form of the "Q-switch" because it has the advantage of providing total internal reflection in the azimuthal direction, perpendicular to the roof vertex 19 for misalignments of as much as about 5 degrees in azimuth. Thus, the azimuthal alignment requirements for the roof prism are definitely not critical. Furthermore, since the prism is rotated in the plane containing the roof vertex 19 and the normal to the front face of the prism, precise alignment is automatically accomplished in that direction. The ease of optical alignment combined with the spring-driven rotation device yields a "Q-switch" which is easy to operate and is inherently simple, reliable, rugged, virtually impervious to its environment, and free of critical adjustments.

The measured rotational velocity, as the prism makes its first pass through the laser optic axis 13, is more than 12,000 r.p.m. At this velocity of rotation, the output of the system is characterized by a large initial pulse followed by a few small secondary pulses spaced about 0.1 to 0.2 microsecond apart. It is significant to note that extensive laboratory tests have indicated that, for the selected values of switching speed and ruby inversion, the first pulse is always the largest pulse.

A critical factor in obtaining high energy single pulse outputs is the establishment of proper and precise timing between the rotating prism and the pumping energy pulse taking into account the shape of that pulse. If the prism passes through the laser optical axis too soon and the laser action occurs, the effect is that energy in the output is transferred from the first pulse to the secondary pulses. If the prism passes through the optical axis too long an interval after the pumping has been completed, natural fluorescent decay and internal loss mechanisms within the ruby dissipate much of the stored energy. Thus, the energy output available may be below that required for ranging purposes.

In the present system, the pumping is accomplished by a linear, 2-inch arc length, flash tube 61. The pulse forming network 59A supplying energy to flash tube 61 provides a nearly rectangular pulse having a duration of from about 300 to about 500 microseconds. To avoid the effects of bad timing mentioned above, the timing is set so that laser action occurs on the trailing edge of the pumping pulse. FIG. 8 diagrammatically shows the "Q-switch" operation.

The laser head in the present system consists of conventional flash tube trigger circuitry 59 for producing the high voltage trigger required by the flash tube 61; the laser pump reflector; a 2-inch long ¼ inch diameter, 0.05 percent chromium doped ruby 14; a linear 2-inch arc length xenon flash tube 61, the multi-layer dielectric coated optical flat 21, and a roof prism 18 used in the "Q-switch." It is through the partially transparent reflector 21 that the main laser beam energy 74 is transmitted.

What is claimed is:
1. A laser switching device comprising:
a laser cavity having a stationary reflector at one end and a rotatable reflector at the other end and having a completed regenerative path along an optic axis therebetween when said rotatable reflector is rotated through said optic axis;
an active laser element disposed in said cavity, said optic axis extending through said laser element;
pump energy means optically coupled to said laser element for pumping said laser element to an excited state;
potential energy storage means connected to said rotatable reflector for storing energy and when released to rotate said rotatable reflector through said optic axis but less than one revolution;
cocking means coupled to said potential energy storage means for storing energy therein;
triggering means coupled to said potential energy storage means for releasing energy stored therein; and
timing means coupled to said rotatable reflector and to said pump energy means for initiating the pumping of said laser element a predetermined period of time prior to the time said rotatable reflector rotates through said optic axis.

2. A laser switching device comprising:
a laser cavity structure including a stationary reflector at one end and a second reflector mounted on a rotatably mounted shaft at the other end and having a completed regenerative path along an optic axis therebetween when said second reflector is rotated through said optic axis by the rotation of said shaft;
an active laser element disposed in said cavity, said optic axis extending through said laser element;
pump energy means optically coupled to said laser element for pumping said laser element to an excited state;
potential energy storage means including a coil spring mounted around said shaft with one end thereof attached to said cavity structure and the other end attached to said shaft, for storing rotational energy and when released, to rotate said shaft and said second reflector through said optic axis but less than one revolution of said shaft;

cocking means coupled to said potential storage means for storing energy therein;

triggering means coupled to said potential energy storage means for releasing energy stored therein to rotate said shaft; and timing means including a cam mounted on said shaft, an associated cam follower and switch assembly, said switch assembly being connected to said pump energy means, for initiating the pumping of said laser element a predetermined period of time prior to the time said regenerative path is completed by the movement of said second reflector through said optic axis.

3. A laser switching device according to claim 2, wherein said second reflector is an internal reflecting prism and wherein said active laser element is a ruby rod.

References Cited by the Examiner

UNITED STATES PATENTS

| | | | |
|---|---|---|---|
| 2,182,097 | 12/1939 | Schenk | 95—42 |
| 2,365,899 | 12/1944 | Nadel | 95—42 X |
| 2,441,370 | 5/1948 | Pearce | 351—7 X |
| 2,550,698 | 5/1951 | King et al. | 95—42 |
| 2,956,490 | 10/1960 | Staudt | 95—42 X |

OTHER REFERENCES

Benson: "New Laser Technique for Ranging Application," NEREM Record, vol. IV, pp. 34–35, Nov. 5, 1962.

Collins: "Control of Population Inversion in Pulsed Optical Lasers by Feedback Modulation," J. App. Phys., vol. 33, No. 6, pp. 2009–2011, June 1962.

JEWELL H. PEDERSEN, *Primary Examiner.*

E. S. BAUER, *Assistant Examiner.*